United States Patent
Wang et al.

(10) Patent No.: US 11,755,987 B2
(45) Date of Patent: Sep. 12, 2023

(54) DETERMINING ESTIMATED DELIVERY TIME OF ITEMS OBTAINED FROM A WAREHOUSE FOR USERS OF AN ONLINE CONCIERGE SYSTEM TO REDUCE PROBABILITIES OF DELIVERY AFTER THE ESTIMATED DELIVERY TIME

(71) Applicant: Maplebear Inc., San Francisco, CA (US)

(72) Inventors: Zi Wang, Mountain View, CA (US); Ji Chen, Mountain View, CA (US); Houtao Deng, Sunnyvale, CA (US); Soren Zeliger, Oakland, CA (US); Yijia Chen, Oakland, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 17/359,486

(22) Filed: Jun. 25, 2021

(65) Prior Publication Data

US 2022/0414592 A1 Dec. 29, 2022

(51) Int. Cl.
*G06Q 10/0833* (2023.01)
*G06Q 10/087* (2023.01)

(52) U.S. Cl.
CPC ....... *G06Q 10/0833* (2013.01); *G06Q 10/087* (2013.01)

(58) Field of Classification Search
CPC .. G06Q 10/08; G06Q 10/083; G06Q 10/0832; G06Q 10/0833; G06Q 10/0835; G06Q 10/0837; G06Q 10/0838
See application file for complete search history.

(56) References Cited

U.S. PATENT DOCUMENTS

2014/0279294 A1* 9/2014 Field-Darragh ... G06Q 30/0282 705/28
2015/0088581 A1* 3/2015 Ikawa .............. G06Q 10/06313 705/7.23

(Continued)

FOREIGN PATENT DOCUMENTS

KR      102338783 B1 * 12/2021 ......... G06Q 10/0832
WO   WO-2021017609 A1 *  2/2021 ........... G06K 9/6268

OTHER PUBLICATIONS

Khiari, Jihed, and Cristina Olaverri-Monreal. "Boosting algorithms for delivery time prediction in transportation logistics." 2020 International Conference on Data Mining Workshops (Icdmw). IEEE, 2020. (Year: 2020).*

*Primary Examiner* — Emmett K. Walsh
(74) *Attorney, Agent, or Firm* — Fenwick & West LLP

(57) ABSTRACT

An online concierge system displays an interface to a user identifying an estimated time of arrival for an order. To generate the estimated time of arrival for the order, the online concierge system trains a prediction engine to predict delivery time based on a predicted selection time for a shopper to select the order for fulfillment and predicted travel time for the shopper to deliver items of the order to a location identified by the order. The online concierge system generates a policy optimization model that computes an adjustment for the predicted delivery time. The adjustment is determined by solving a stochastic optimization problem with a constraint on a probability of the order being delivered after the estimated time of arrival. The predicted delivery time combined with the adjustment determines the estimated time of delivery displayed to the user to balance between minimizing late deliveries and wait times.

20 Claims, 7 Drawing Sheets

(56) References Cited

U.S. PATENT DOCUMENTS

| | | | |
|---|---|---|---|
| 2019/0180229 A1* | 6/2019 | Phillips | G06Q 10/0833 |
| 2020/0410440 A1* | 12/2020 | Hickey | G06Q 10/0833 |
| 2021/0089995 A1* | 3/2021 | Iacono et al. | G06Q 10/083 |

* cited by examiner

DETERMINING ESTIMATED DELIVERY TIME OF ITEMS OBTAINED FROM A WAREHOUSE FOR USERS OF AN ONLINE CONCIERGE SYSTEM TO REDUCE PROBABILITIES OF DELIVERY AFTER THE ESTIMATED DELIVERY TIME

BACKGROUND

This disclosure relates generally to ordering items through an online concierge system, and more specifically to determining an estimated delivery time to a user of items in an order for display to users of the online concierge system.

In current online concierge systems, shoppers (or "pickers") fulfill orders at a physical warehouse, such as a retailer, on behalf of users as part of an online shopping concierge service. An online concierge system provides an interface to a user identifying items offered by a physical warehouse and receives selections of one or more items for an order from the user. In current online concierge systems, the shoppers may be sent to various warehouses with instructions to fulfill orders for items, and the shoppers then find the items included in the user order in a warehouse.

Conventional online concierge systems maintain discrete time windows during which orders are fulfilled, and a user selects a specific time window for an order to be fulfilled and delivered to the user. For example, a user selects a time window corresponding to a specific range of times to schedule an order for fulfillment in the future or selects a time window that is an amount of time from a time when the order is placed for the order to be fulfilled as soon as possible. This allows users of an online concierge system to select a specific window for receiving items from an order or to obtain the items in an order within a specified time interval from a time when the order is placed.

Additionally, an online concierge system allows users to specify a short-term order for fulfillment within a time interval of a time when the order was received. For example, a short term-order specifies delivery of a short-term order within two hours of a time when the online concierge system receives the order. While this allows users flexibility in having orders fulfilled within a specified time interval of a time when the order was received by an online concierge system, the specified time interval for fulfillment of a short-term order provides uncertainty for a user to account for when the order will be delivered to the user.

Conventional online concierge systems maintain one or more specific time intervals relative to a time when an order is received for fulfilling a short-term order, as conventional techniques for determining an estimated time of arrival for an order assume early arrival of the order and late arrival of the order incur the same negative impact on users. Additionally, conventional techniques for determining an estimated time of arrival fail to account for effects of metrics or factors other than estimated time of arrival on subsequent user interactions.

SUMMARY

An online concierge system allows a user to specify an order for short-term fulfillment when there is shopper availability after the online concierge system receives the order. The online concierge system displays an interface to a user allowing the user to identify an order for short-term fulfillment or to select a discrete time interval during which the order is fulfilled. The interface includes an estimated time of arrival for the order in conjunction with an option for short-term fulfillment of the order to provide the user with an estimate of a time by which the user will receive the order to allow the user to more accurately determine whether to identify the order for short-term fulfillment.

To determine the estimated time of arrival for the order, the online concierge system retrieves historical data describing fulfilled orders previously received by the online concierge system. From the historical data describing previously fulfilled orders, the online concierge system trains a prediction model to determine a predicted delivery time for an order. The prediction model receives an order as an input and outputs a predicted delivery time from characteristics of the order.

In various embodiments, the prediction model accounts for a time between the online concierge system receiving an order from a user and a shopper selecting the order for fulfillment. For example, the online concierge system identifies a location included in an order and determines a geographic region including the location included in the order. Based on a rate at which the online concierge system receives orders including locations within the determined geographic region, a rate at which shoppers select orders including locations within the determined geographic region for fulfillment, a number of orders including locations within the determined geographic region received by the online concierge system and not selected for fulfillment by shoppers, the prediction model determines a selection time interval indicating a length of time from receipt of the order by the online concierge system to a shopper selecting the order for fulfillment. The prediction model may account for any additional factors describing receipt of orders with locations within the determined geographic region and selection of orders with locations within the determined geographic region by shoppers for fulfillment in various embodiments. Hence, in various embodiments, the online concierge system determines a geographic region including a location within an order and determines a selection time interval for the order, with the selection time interval indicating a length of time between receipt of the order by the online concierge system and selection of the order for fulfillment by a shopper. For example, the prediction model determines an average selection time for the geographic region including the location identified by the order.

While the selection time interval accounts for numbers of orders received by the online concierge system and selection of orders for fulfillment by shoppers, characteristics of an order may affect selection of the order by a shopper for fulfillment. For example, orders with higher values provide a shopper with increased compensation, causing orders with higher values to be more rapidly selected for fulfillment by shoppers. As another example, orders with longer distances between a warehouse identified by the order and a location for delivery of the order provide increased compensation from the online concierge system to a shopper, causing orders with longer distances for a shopper to travel from warehouse to location for delivery to be more rapidly selected for fulfillment by shoppers. The prediction model accounts for order-specific characteristics to determine an adjustment for the selection time determined for the order, allowing the prediction model to account for characteristics of the order that may lengthen or shorten the selection time for the order. Example characteristics of an order for determining the adjustment include: a number of items in the order, a distance between a warehouse identified in the order and a location identified in the order, a value of the order, an amount of compensation the user provides a shopper for fulfilling the order, as well as any other suitable characteristics. The prediction model combines the selection time and the adjustment to generate a delivery specific selection time for the order. In various embodiments, the delivery specific selection time is a product of the selection time for the order and the adjustment, while in other embodiments the selection time and the adjustment may be combined in any suitable manner.

The prediction model also accounts for a travel time of a shopper fulfilling the order, accounting for a time interval after the shopper selects the order for fulfillment for the shopper to obtain the items of the order from a warehouse identified by the order and to deliver the items from the order to a location identified by the order. The travel time is determined from characteristics of the order as well as historical information about traffic or road conditions the online concierge system obtains from a third party system or from previously fulfilled orders by shoppers. Characteristics of the order used to determine travel time include a number of items in the order (orders with greater number of items may increase a length of time in a warehouse to obtain the items), a warehouse from which the items are obtained, and a distance between the location of the warehouse from which the items are obtained and a location identified by the order.

In various embodiments, the online concierge system trains and maintains separate models for determining a selection time of an order, an adjustment to the selection time of the order, and a travel time of the order. Each of the models be any machine learning model, such as a neural network, boosted tree, gradient boosted tree, random forest model, or combination of machine learning models. Different types of machine learning models may be used to determine the selection time of an order, the adjustment to the selection time of the order, and the travel time of the order, with the prediction model combining the separate models to determine a predicted delivery time for an order. For example, the predicted delivery time for the order is a sum of the travel time of the order and a product of the selection time of the order and the adjustment to the selection time of the order. However, in other embodiments, the predicted delivery time is determined from any suitable combination of the travel time of the order, the adjustment to the selection time of the order, and the selection time of the order. Alternatively, the prediction model is a single model generating the selection time of an order, an adjustment to the selection time of the order, a travel time of the order, and determining the delivery time of the order by combining the selection time, the adjustment to the selection time, and the travel time.

While the prediction model is trained through any suitable training process, such as minimizing one or more loss functions based on predicted delivery times and measured delivery times, the prediction errors used to evaluate the prediction model are not directly linked to quantities likely to affect subsequent user interaction with the online concierge system. For example, loss functions describing accuracy the prediction model do not account for a length of time a user waits for an order to be fulfilled or whether the order was fulfilled after a time the online concierge system identified to the user. Similarly, improving performance of the prediction model may increase an accuracy of the prediction model, but result in a number of orders being fulfilled after a time identified to the user by online concierge system, which may deter users from subsequently providing additional orders to the online concierge systems.

To account for factors affecting likelihoods of users placing additional orders through the online concierge system, when training the prediction model the online concierge system also applies a policy optimization model that accounts for wait times for users from receipt of an order from the user by the online concierge system to fulfillment of the order and a percentage of orders fulfilled after a time for fulfillment identified to a user by the online concierge system. The policy optimization model receives a delivery time predicted by the prediction model and determines a modification to the delivery time predicted by the prediction model, with the policy optimization model determining a modification to a delivery time predicted by the prediction model to optimize a probability of an order being fulfilled after a combination of the modification to the predicted delivery time and a wait time for users from receipt of an order from the user by the online concierge system to fulfillment of the order. As shortening a wait time increases a probability of the order being fulfilled after a time identified by the online concierge system, while decreasing the probability of the order being fulfilled after the time identified by the online concierge system increases the wait time, to optimize these different objectives, the online concierge system specifies a threshold probability of an order being fulfilled after a time identified by the online concierge system, and the policy optimization model optimizes a wait time for an order as a function of the predicted delivery time and the modification subject to a constraint that the probability of the order being fulfilled after a time identified by the online concierge system does not exceed the threshold probability. This allows the policy optimization model to balance between minimizing late deliveries and wait times. In various embodiments, the online concierge system generates the policy optimization model by solving a stochastic optimization problem with the constraint of the probability of the order being fulfilled after a time identified by the online concierge system not exceeding the threshold probability.

In other embodiments, the policy optimization model determines a modification to a delivery time predicted by the prediction model to optimize a probability of an order being fulfilled after a combination of the modification to the predicted delivery time and a user performing a specific interaction, such as providing an order to the online concierge system (which is affected by the wait time from receipt of an order from the user by the online concierge system to fulfillment of the order). In such an implementation, the online concierge system generates the policy optimization model to balance between minimizing late deliveries and a likelihood of the user performing the specific interaction, allowing the policy optimization model to optimize the user performing the specific interaction subject to the constraint that a probability of the order being fulfilled after a time identified by the online concierge system does not exceed the threshold probability.

In other embodiments, the policy optimization model accounts for other factors to determine the modification to the delivery time predicted by the prediction model. For example, the online concierge system specifies a threshold probability of an order being fulfilled greater than a specified duration after a time identified by the online concierge system, and the policy optimization model optimizes a wait time for an order as a function of the predicted delivery time and the modification subject to a constraint that the probability of the order being fulfilled greater than the specified duration after the time identified by the online concierge system does not exceed the threshold probability. In other embodiments, rather than optimize a wait time as a function of the predicted delivery time and the modification subject to a constraint that the probability of the order being fulfilled after a time identified by the online concierge system does not exceed the threshold probability (or a constraint that the probability of the order being fulfilled greater than the specified duration after the time identified by the online concierge system does not exceed a threshold probability of the order being fulfilled greater than a specified duration after a time identified by the online concierge system), the policy optimization model optimizes an amount of shoppers available during one or more discrete time intervals relative to a time when a request for an order was received, optimizes a cost to the online concierge system of fulfilling orders, optimizing a conversion rate for users performing a specific interaction with the online concierge system (e.g., placing an order with the online concierge system); in various embodiments, the conversion rate is determined through another model trained from prior conversions by users of the online concierge system. However, in other embodiments, the online concierge system optimizes any suitable metric affecting a placement of an order by a user subject to a constraint on any suitable quantity describing fulfillment of orders after the time identified by the online concierge system. Hence, in various embodiments, the online concierge system uses any suitable quantities for the policy optimization to determine the modification to the delivery time.

After training the prediction model and generating the policy optimization model, the online concierge system receives a request for an additional order from a user. From application of the prediction model to the request for the additional order, the online concierge system determines a predicted delivery time for the additional order. By applying the policy optimization model to the predicted delivery time, the online concierge system determines a modification to the predicted delivery time and generates a modified delivery time for the order by combining the predicted delivery time and the modification (e.g., by summing the predicted delivery time and the modification). From a time when the additional order was received and the modified delivery time, the online concierge system determines an estimated time of arrival (ETA) of the order to the additional user. For example, the online concierge system adds the modified delivery time to the time when the request for the additional order was received to determine the estimated time of arrival of the order and displays the estimated time of arrival of the additional order to the user. For example, the estimated time of arrival of the order is displayed in an interface in conjunction with information identifying the additional order. The interface may also display an option to have the order fulfilled by the estimated time of arrival, allowing the user to select short term fulfillment of the additional order based on the estimated time of arrival determined by the online concierge system, allowing the user to specify when the additional order is fulfilled from the interface displayed after the online concierge system receives the request for the additional order and before the user finalizes the additional order for fulfillment by the online concierge system. This allows the online concierge system to provide modified estimated time of arrivals to a user that reduces wait time for order fulfillment while reducing a probability of the order being fulfilled after a time identified to the user by the online concierge system.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
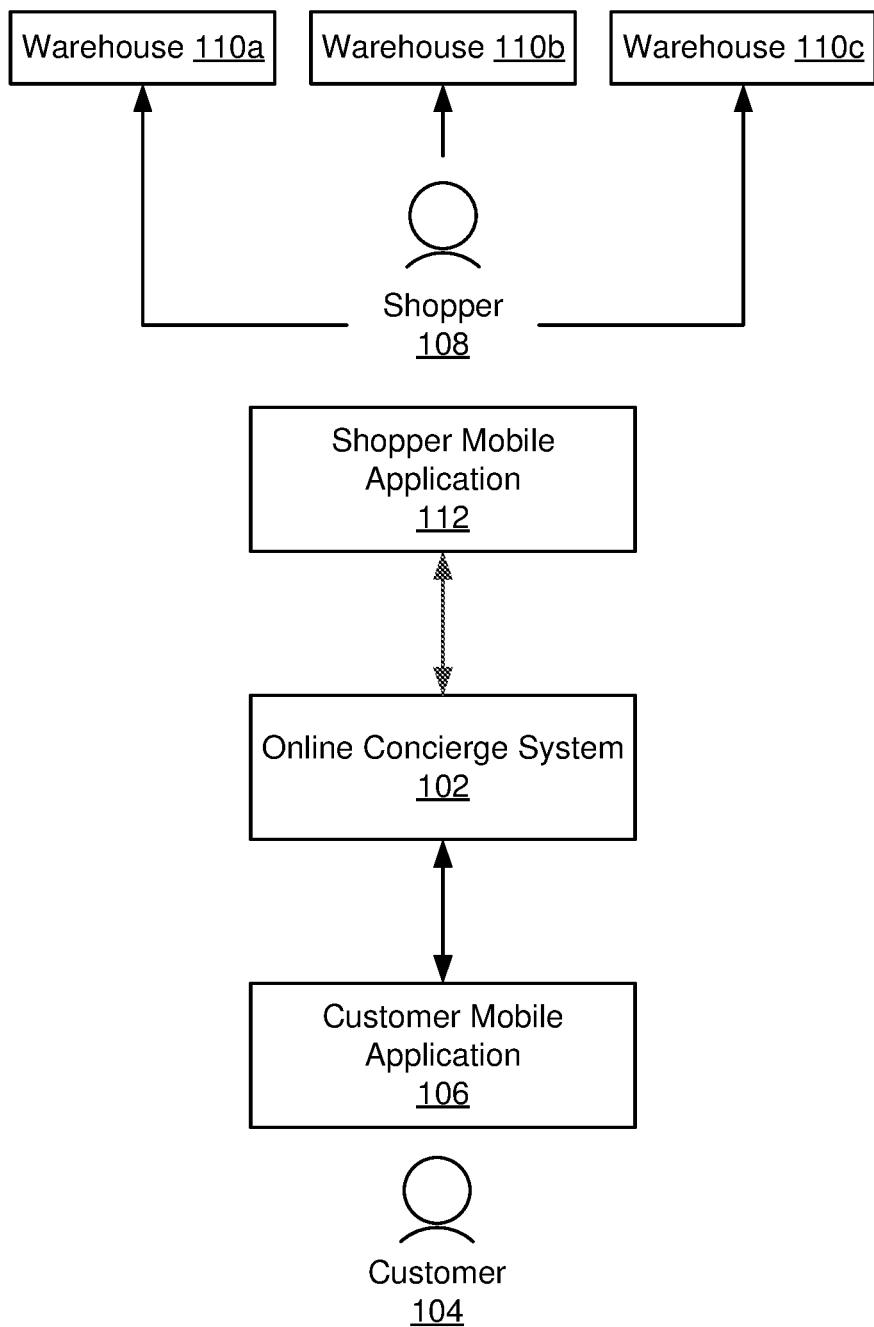
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more users 104 (only one is shown for the sake of simplicity). An order specifies a list of goods (items or products) to be delivered to the user 104. The order also specifies the location to which the goods are to be delivered, and a time window during which the goods should be delivered. In some embodiments, the order specifies one or more retailers from which the selected items should be purchased. The user may use a customer mobile application (CMA) 106 to place the order; the CMA 106 is configured to communicate with the online concierge system 102.

The online concierge system 102 is configured to transmit orders received from users 104 to one or more shoppers 108. A shopper 108 may be a contractor, employee, other person (or entity), robot, or other autonomous device enabled to fulfill orders received by the online concierge system 102. The shopper 108 travels between a warehouse and a delivery location (e.g., the user's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to users. Each shopper 108 fulfills an order received from the online concierge system 102 at one or more warehouses 110, delivers the order to the user 104, or performs both fulfillment and delivery. In one embodiment, shoppers 108 make use of a shopper mobile application 112 which is configured to interact with the online concierge system 102.

Figure 2:
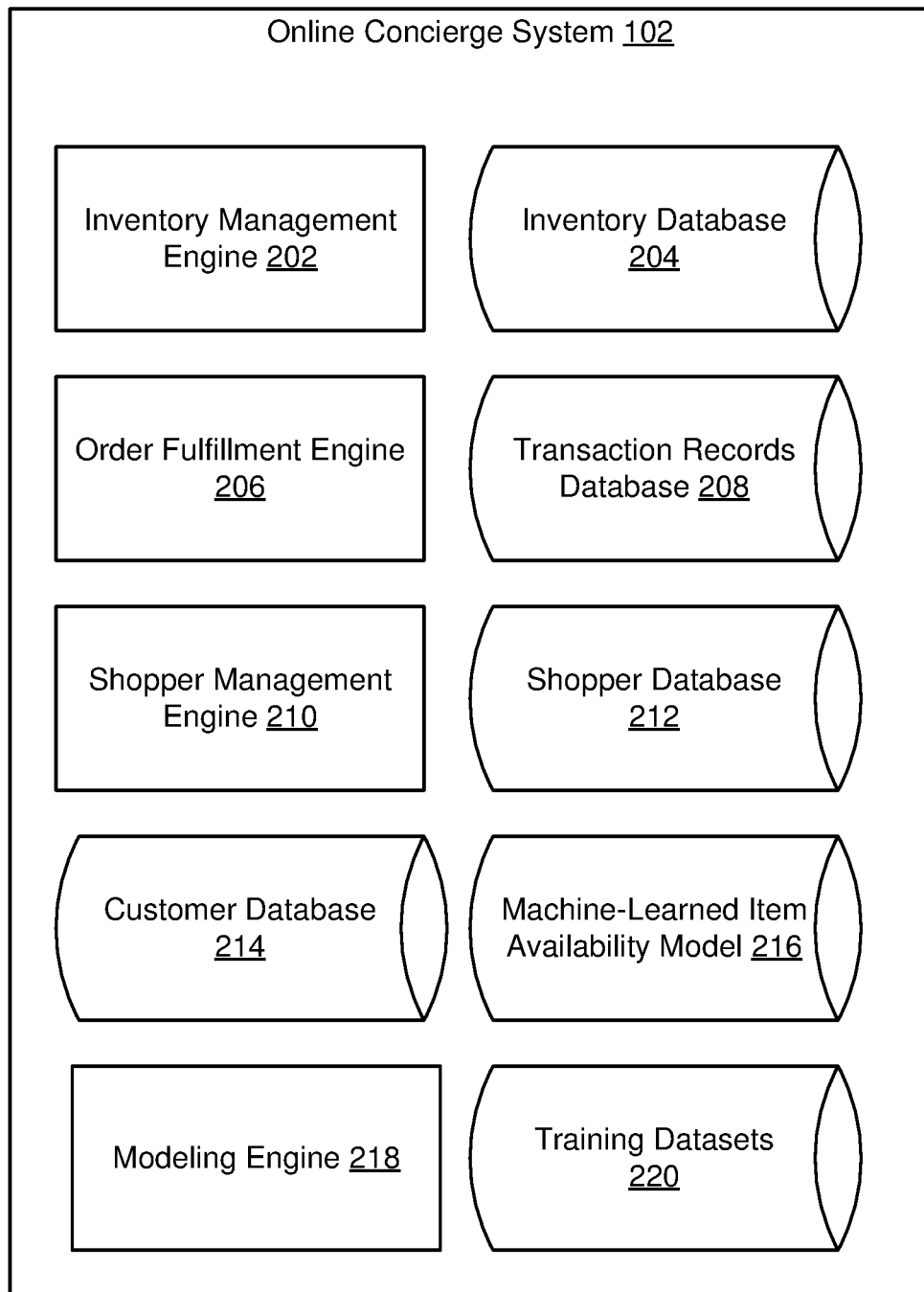
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

Inventory information provided by the inventory management engine 202 may supplement the training datasets 220. Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each user 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a user 104. Prices set by the order fulfillment engine 206 may or may not be identical to in-store prices determined by retailers (which is the price that users 104 and shoppers 108 would pay at the retail warehouses). The order fulfillment engine 206 also facilitates transactions associated with each order. In one embodiment, the order fulfillment engine 206 charges a payment instrument associated with a user 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and user 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse 110 to fulfill the order based on one or more parameters, such as a probability of item availability determined by a machine-learned item availability model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the user 104), his/her familiarity level with that particular warehouse 110, and so on. Additionally, the shopper management engine 210 accesses a shopper database 212 which stores information describing each shopper 108, such as his/her name, gender, rating, previous shopping history, and so on. Methods that can be used to identify a warehouse 110 at which a shopper 108 can likely find most or all items in an order are described with respect to FIG. 4.

As part of fulfilling an order, the order fulfillment engine 206 and/or shopper management engine 210 may access a user database 214 which stores information describing each user. This information could include each user's name, address, gender, shopping preferences, favorite items, stored payment instruments, and so on.

In various embodiments, the order fulfillment engine 206 generates an estimated time of arrival for an order received from a user, allowing the estimated time of arrival to be displayed in an interface in conjunction with information identifying the order. An option to select the order for short-term fulfillment by the estimated time of arrival is also displayed in the interface, allowing the user to account for the estimated time of arrival when determining whether to select the order for short-term fulfillment. As further described below in conjunction with FIGS. 5-7, the order fulfillment engine accounts for a predicted delivery time for an order from characteristics of the order, as well a policy optimization model generated to determine a modification to the predicted delivery time to optimize a probability of an order being fulfilled after a combination of the modification to the predicted delivery time and a wait time for users from receipt of an order from the user by the online concierge system to fulfillment of the order. As further described below in conjunction with FIGS. 5-7, modifying the predicted delivery time by the modification from the predicted delivery time allows the order fulfillment engine 206 to display an estimated time of arrival for an order that optimizes a wait time for order fulfillment while reducing a probability of the order being fulfilled after a time identified to the user by the order fulfillment engine 206.

Machine Learning Models

The online concierge system 102 further includes a machine-learned item availability model 216, a modeling engine 218, and training datasets 220. The modeling engine 218 uses the training datasets 220 to generate the machine-learned item availability model 216. The machine-learned item availability model 216 can learn from the training datasets 220, rather than follow only explicitly programmed instructions. The inventory management engine 202, order fulfillment engine 206, and/or shopper management engine 210 can use the machine-learned item availability model 216 to determine a probability that an item is available at a warehouse 110. The machine-learned item availability model 216 may be used to predict item availability for items being displayed to or selected by a user or included in received delivery orders. A single machine-learned item availability model 216 is used to predict the availability of any number of items.

The machine-learned item availability model 216 can be configured to receive as inputs information about an item, the warehouse for picking the item, and the time for picking the item. The machine-learned item availability model 216 may be adapted to receive any information that the modeling engine 218 identifies as indicators of item availability. At minimum, the machine-learned item availability model 216 receives information about an item-warehouse pair, such as an item in a delivery order and a warehouse at which the order could be fulfilled. Items stored in the inventory database 204 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 204 and/or warehouse database and provide this extracted information as inputs to the item availability model 216.

The machine-learned item availability model 216 contains a set of functions generated by the modeling engine 218 from the training datasets 220 that relate the item, warehouse, and timing information, and/or any other relevant inputs, to the probability that the item is available at a warehouse. Thus, for a given item-warehouse pair, the machine-learned item availability model 216 outputs a probability that the item is available at the warehouse. The machine-learned item availability model 216 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 216 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper, or predicted to be unavailable but found by the shopper). In some examples, the confidence score is based in part on the age of the data for the item, e.g., if availability information has been received within the past hour, or the past day. The set of functions of the item availability model 216 may be updated and adapted following retraining with new training datasets 220. The machine-learned item availability model 216 may be any machine learning model, such as a neural network, boosted tree, gradient boosted tree or random forest model. In some examples, the machine-learned item availability model 216 is generated from XGBoost algorithm.

The item probability generated by the machine-learned item availability model 216 may be used to determine instructions delivered to the user 104 and/or shopper 108, as described in further detail below.

The training datasets 220 relate a variety of different factors to known item availabilities from the outcomes of previous delivery orders (e.g. if an item was previously found or previously unavailable). The training datasets 220 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 220 includes the outcome of a previous delivery order (e.g., if the item was picked or not). The item characteristics may be determined by the machine-learned item availability model 216 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 216 may weight these factors differently, where the weights are a result of a "learning" or training process on the training datasets 220. The training datasets 220 are very large datasets taken across a wide cross section of warehouses, shoppers, items, warehouses, delivery orders, times and item characteristics. The training datasets 220 are large enough to provide a mapping from an item in an order to a probability that the item is available at a warehouse. In addition to previous delivery orders, the training datasets 220 may be supplemented by inventory information provided by the inventory management engine 202. In some examples, the training datasets 220 are historic delivery order information used to train the machine-learned item availability model 216, whereas the inventory information stored in the inventory database 204 include factors input into the machine-learned item availability model 216 to determine an item availability for an item in a newly received delivery order. In some examples, the modeling engine 218 may evaluate the training datasets 220 to compare a single item's availability across multiple warehouses to determine if an item is chronically unavailable. This may indicate that an item is no longer manufactured. The modeling engine 218 may query a warehouse 110 through the inventory management engine 202 for updated item information on these identified items.

Additionally, the modeling engine 218 maintains a trained prediction model, further described below in conjunction with FIG. 5 that determines a predicted delivery time of an order to a user based on characteristics of the order. The prediction model is trained from orders previously fulfilled by the online concierge system 102. The predicted delivery time accounts for a selection time indicating a time interval from receipt of an order to selection of the order by a shopper for fulfillment from characteristics of orders received by the online concierge system 102 and characteristics of a particular order, as well as a travel time describing a length of time for a shopper to obtain items of the particular order and deliver the obtained items to a location identified by the order. The trained purchase model may be trained using any suitable method or combination of methods (e.g., supervised learning, unsupervised learning, semi-supervised learning, etc.) and may be any machine learning model, such as a neural network, boosted tree, gradient boosted tree, random forest model, or combination of machine learning models.

As further described below in conjunction with FIGS. 5-7, the modeling engine 218 also trains and stores a policy optimization module, which determines a modification to a predicted delivery time generated by the prediction model. The policy optimization model receives a delivery time predicted by the prediction model and determines a modification to the delivery time predicted by the prediction model, with the policy optimization model trained to determine a modification to a delivery time predicted by the prediction model to optimize a probability of an order being fulfilled after a combination of the modification to the predicted delivery time and a wait time for users from receipt of an order from the user by the online concierge system to fulfillment of the order. In various embodiments, the modeling engine 218 specifies a threshold probability of an order from a user being fulfilled after a time identified by the order fulfillment engine 216 and generates the policy optimization model to optimize a predicted time identified to the user for fulfillment of the order determined as a function of the predicted delivery time and the modification subject to a constraint that the probability of the order being fulfilled after a time identified by the order fulfillment engine 216 does not exceed the threshold probability. In some embodiments, the policy optimization model minimizes a wait time for an order as a function of a predicted delivery time of the order and the modification subject to the probability of the order being fulfilled after a time identified by the order fulfillment engine 216 does not exceed the threshold probability. This allows the modeling engine 218 to balance between minimizing late deliveries and wait times through application of the policy optimization model. In various embodiments, the modeling engine 218 generates the policy optimization model by solving a stochastic optimization problem with the constraint of the probability of the order being fulfilled after a time identified to a user by the order fulfillment engine 216 not exceeding the threshold probability. The modeling engine 218 subsequently applies the policy optimization model to predicted delivery times obtained from application of the trained prediction model to orders.

Machine Learning Factors

The training datasets 220 include a time associated with previous delivery orders. In some embodiments, the training datasets 220 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 220 include a day of the week previous delivery orders were placed. The day of the week may impact item availability, since popular shopping days may have reduced inventory of items or restocking shipments may be received on particular days. In some embodiments, training datasets 220 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 220 include a time interval since an item was not found in a previous delivery order. If there has been a short time interval since an item was not found, this may indicate that there is a low probability that the item is available in subsequent delivery orders. And conversely, if there is has been a long time interval since an item was not found, this may indicate that the item may have been restocked and is available for subsequent delivery orders. In some examples, training datasets 220 may also include a rate at which an item is typically found by a shopper at a warehouse, a number of days since inventory information about the item was last received from the inventory management engine 202, a number of times an item was not found in a previous week, or any number of additional rate or time information. The relationships between this time information and item availability are determined by the modeling engine 218 training a machine learning model with the training datasets 220, producing the machine-learned item availability model 216.

The training datasets 220 include item characteristics. In some examples, the item characteristics include a department associated with the item. For example, if the item is yogurt, it is associated with the dairy department. The department may be the bakery, beverage, nonfood and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability, since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 218 training a machine learning model with the training datasets 220, producing the machine-learned item availability model 216.

The training datasets 220 may include additional item characteristics that affect the item availability and can therefore be used to build the machine-learned item availability model 216 relating the delivery order for an item to its predicted availability. The training datasets 220 may be periodically updated with recent previous delivery orders. The training datasets 220 may be updated with item availability information provided directly from shoppers 108. Following updating of the training datasets 220, a modeling engine 218 may retrain a model with the updated training datasets 220 and produce a new machine-learned item availability model 216.

Customer Mobile Application

Figure 3A:
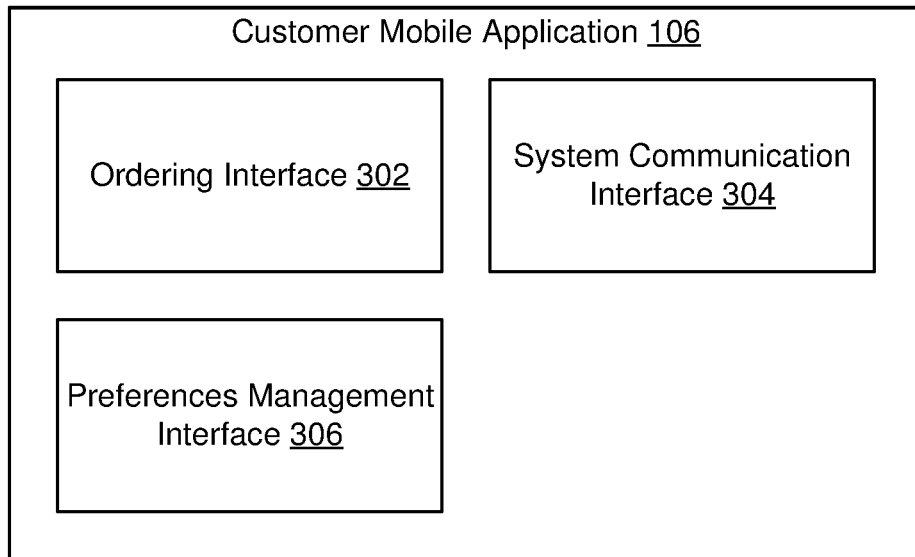
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the user 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the user 104 to manage basic information associated with his/her account, such as his/her home address and payment instruments. The preferences management interface 306 may also allow the user to manage other details such as his/her favorite or preferred warehouses 110, preferred delivery times, special instructions for delivery, and so on.

Shopper Mobile Application

Figure 3B:
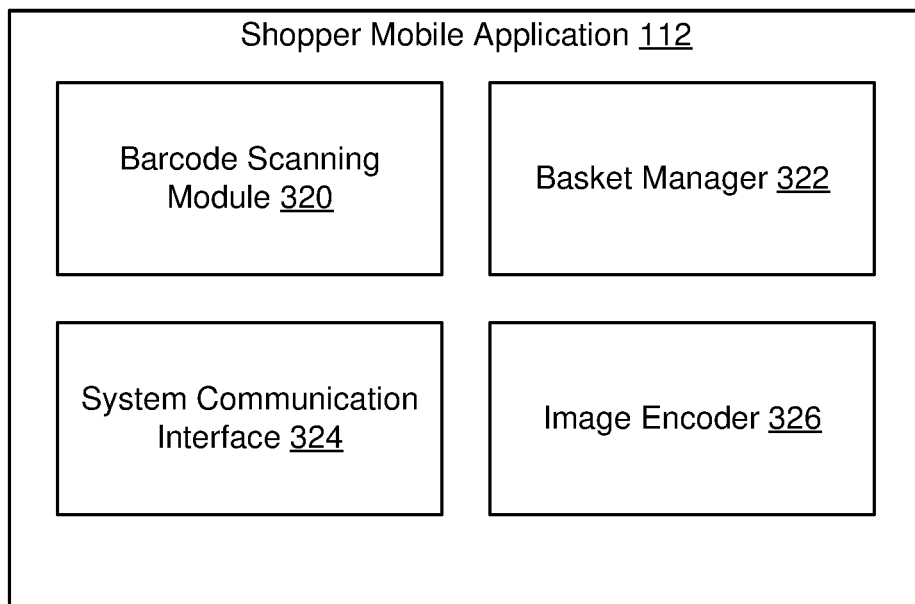
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Predicting Inventory Availability

Figure 4:
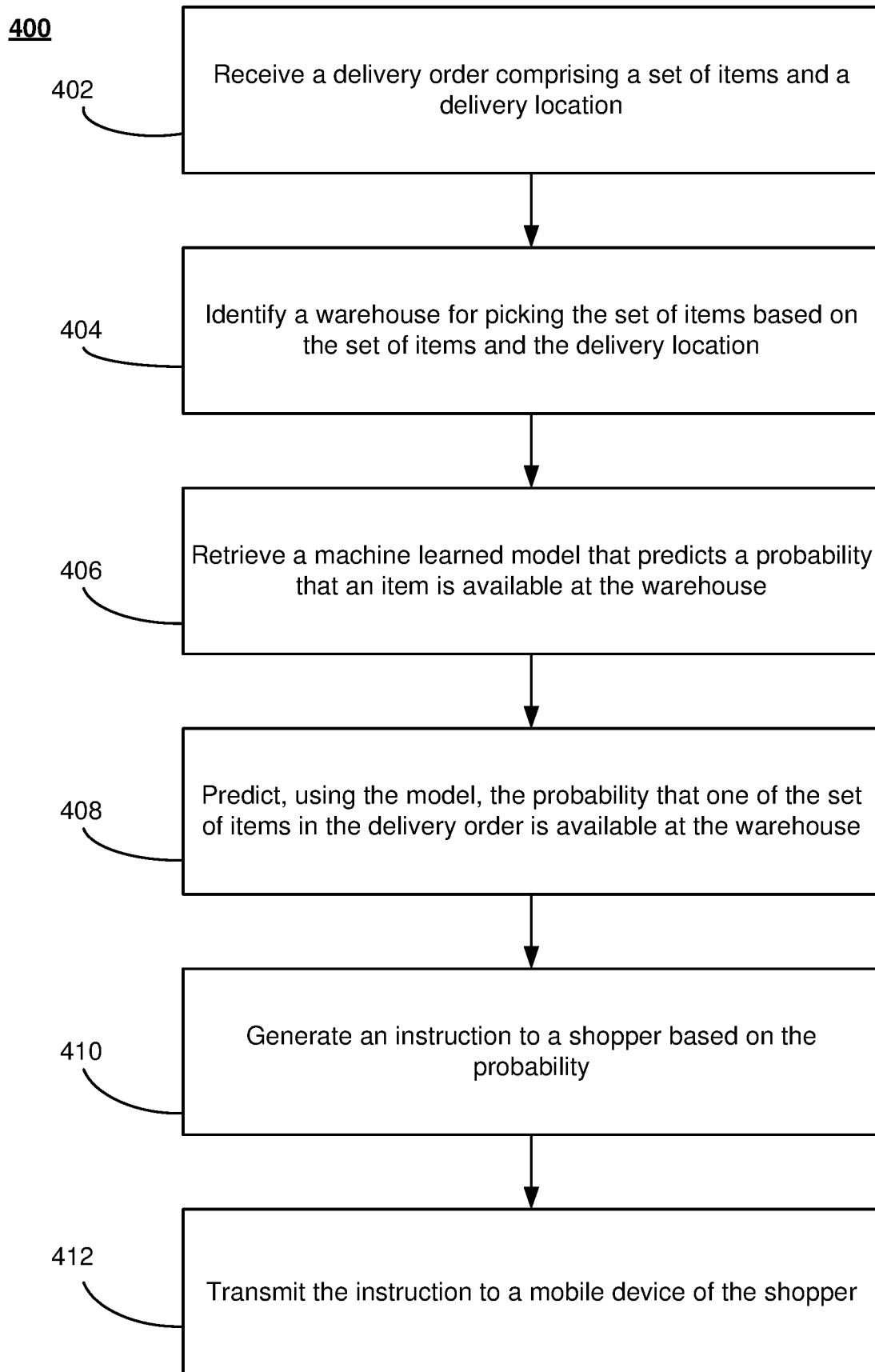
FIG. 4 is a flowchart of a process for predicting inventory availability, according to one embodiment.

As described with reference to FIG. 2, the machine-learned item availability model 216 of the online concierge system 102 can determine an availability of an item requested by the user 104. FIG. 4 is a flowchart illustrating a process 400 for predicting inventory availability, according to one embodiment. The online concierge system 102 receives 402 a delivery order that includes a set of items and a delivery location. The delivery location may be any location associated with a user, such as a user's home or office. The delivery location may be stored with the user location in the user database 214. Based on the delivery order, the online concierge system 102 identifies a warehouse 404 for picking the set of items in the delivery order based on the set of items and the delivery location. In some cases, the user specifies a particular warehouse or set of warehouses (e.g., a particular grocery store or chain of grocery stores) in the order. In other cases, the online concierge system 102 selects the warehouse based on the items and the delivery location. In some examples, there are a number of different possible warehouses that the set of items may be picked from. The warehouses may be identified by the order fulfillment engine 206 based on warehouses stored by the inventory management engine 202, and warehouses are identified with a suitable inventory and within a threshold distance of the delivery address. In some embodiments, a single delivery order can be split into multiple orders and picked at multiple warehouses, e.g., if the items cannot be fulfilled at a single warehouse. In this example, each possible warehouse is input into the machine-learned item availability model 216.

After the warehouses are identified, the online concierge system 102 retrieves 406 the machine-learned item availability model 216 that predicts a probability that an item is available at the warehouse. The items in the delivery order and the identified warehouses are input into the machine-learned item availability model 216. For example, the online concierge system 102 may input the item, warehouse, and timing characteristics for each item-warehouse pair into the machine-learned item availability model 216 to assess the availability of each item in the delivery order at each potential warehouse at a particular day and/or time. The machine-learned item availability model 216 predicts 408 the probability that one of the set of items in the delivery order is available at the warehouse. If a number of different warehouses are identified 404, then the machine-learned item availability model 216 predicts the item availability for each one. In some examples, the probability that an item is available includes a probability confidence score generated by the machine-learned item availability model 216.

The order fulfillment engine 206 uses the probability to generate 410 an instruction to a shopper. The order fulfillment engine 206 transmits the instruction to the shopper through the SMA 112 via the shopper management engine 210. The instruction is based on the predicted probability. In some examples, the shopper management engine 210 instructs the shopper to pick an item in the delivery order at a warehouse with the highest item availability score. For example, if a warehouse is more likely to have more items in the delivery order available than another warehouse, then the shopper management engine 210 instructs the shopper to pick the item at the warehouse with better availability. In some other examples, the order fulfillment engine 206 sends a message and/or instruction to a user based on the probability predicted by the machine-learned item availability model 216.

Determining an Estimated Arrival Time of an Order to a User

Figure 5:
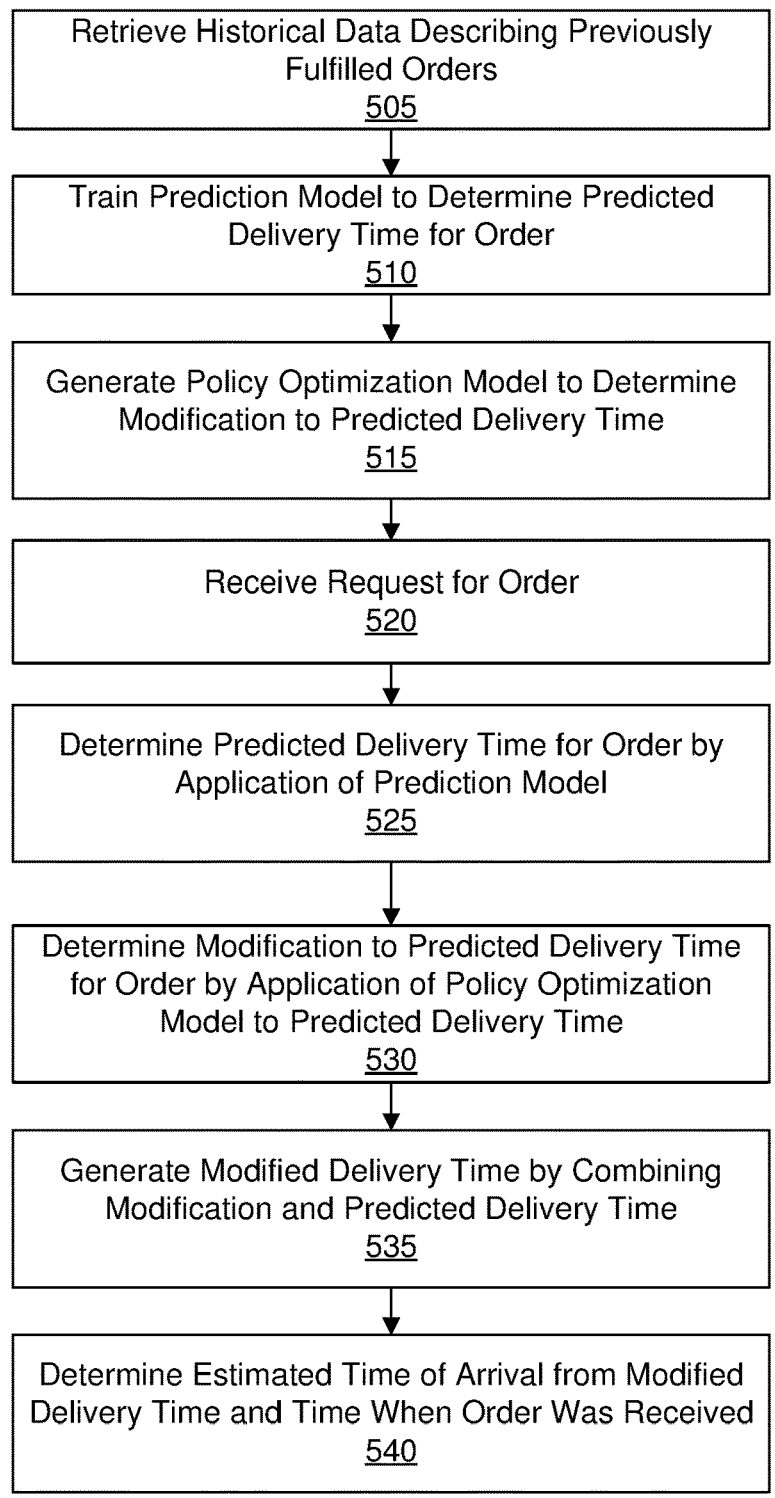
FIG. 5 is a flowchart of a method for determining an estimated time of arrival of an order received by an online concierge system to a user, according to one embodiment.

FIG. 5 is a flowchart of one embodiment of a method for determining an estimated time of arrival of an order received by an online concierge system 102 to a user. In various embodiments, the method includes different or additional steps than those described in conjunction with FIG. 5. Further, in some embodiments, the steps of the method may be performed in different orders than the order described in conjunction with FIG. 5. The method described in conjunction with FIG. 5 may be carried out by the online concierge system 102 in various embodiments.

An online concierge system 102 maintains a plurality of discrete time intervals during which orders received by the online concierge system are fulfilled. For example, the online concierge system maintains multiple two hour intervals during for fulfilling orders. This allows a user of the online concierge system 102 to select a discrete time interval for an order provided by the user so items included in the order are delivered to the user at a time within the selected discrete time interval. By selecting a discrete time interval, a user of the online concierge system 102 is able to schedule delivery of items in the order at a future time within the selected discrete time interval, allowing the user to tailor when the order is fulfilled.

Additionally, the online concierge system 102 allows a user to specify a short-term order for fulfillment when there is shopper availability after the online concierge system 102 receives the order. The online concierge system 102 displays an interface to a user allowing the user to identify an order for short-term fulfillment or to select a discrete time interval during which the order is fulfilled. The interface includes an estimated time of arrival for the order in conjunction with an option for short-term fulfillment of the order to provide the user with an estimate of a time by which the user will receive the order to allow the user to more accurately determine whether to identify the order for short-term fulfillment.

To determine the estimated time of arrival for the order, the online concierge system 102 retrieves 505 historical data describing fulfilled orders previously received by the online concierge system 102. For a previously fulfilled order, the historical data includes information identifying a location to which the previously fulfilled order was delivered, items included in the previously fulfilled order, a number of items included in the previously fulfilled order, a value of the previously fulfilled order, a warehouse 110 from which the items of the previously fulfilled order were obtained, a distance traveled by a shopper to deliver items from the warehouse 110 to the location identified by the previously fulfilled order, a time when the online concierge system 102 received the previously fulfilled order, and a time when the previously fulfilled order was fulfilled. From the historical data describing previously fulfilled orders, the online concierge system 102 trains 510 a prediction model to determine a predicted delivery time for an order. The prediction model receives an order as an input and outputs a predicted delivery time from characteristics of the order.

In various embodiments, the prediction model accounts for a time between the online concierge system 102 receiving an order from a user and a shopper selecting the order for fulfillment. For example, the online concierge system 102 identifies a location included in an order and determines a geographic region including the location included in the order. Based on a rate at which the online concierge system 102 receives orders including locations within the determined geographic region, a rate at which shoppers select orders including locations within the determined geographic region for fulfillment, a number of orders including locations within the determined geographic region received by the online concierge system 102 and not selected for fulfillment by shoppers, the prediction model determines a selection time interval indicating a length of time from receipt of the order by the online concierge system 102 to a shopper selecting the order for fulfillment. The prediction model may account for any additional factors describing receipt of orders with locations within the determined geographic region and selection of orders with locations within the determined geographic region by shoppers for fulfillment in various embodiments. Hence, in various embodiments, the online concierge system 102 determines a geographic region including a location within an order and determines a selection time interval for the order, with the selection time interval indicating a length of time between receipt of the order by the online concierge system 102 and selection of the order for fulfillment by a shopper. For example, the prediction model determines an average selection time for the geographic region including the location identified by the order.

While the selection time interval accounts for numbers of orders received by the online concierge system 102 and selection of orders for fulfillment by shoppers, characteristics of an order may affect selection of the order by a shopper for fulfillment. For example, orders with higher values provide a shopper with increased compensation, causing orders with higher values to be more rapidly selected for fulfillment by shoppers. As another example, orders with longer distances between a warehouse 110 identified by the order and a location for delivery of the order provide increased compensation from the online concierge system 102 to a shopper, causing orders with longer distances for a shopper to travel from warehouse 110 to location for delivery to be more rapidly selected for fulfillment by shoppers. The prediction model accounts for order-specific characteristics to determine an adjustment for the selection time determined for the order, allowing the prediction model to account for characteristics of the order that may lengthen or shorten the selection time for the order. Example characteristics of an order for determining the adjustment include: a number of items in the order, a distance between a warehouse 110 identified in the order and a location identified in the order, a value of the order, an amount of compensation the user provides a shopper for fulfilling the order, as well as any other suitable characteristics. The prediction model combines the selection time and the adjustment to generate a delivery specific selection time for the order. In various embodiments, the delivery specific selection time is a product of the selection time for the order and the adjustment, while in other embodiments the selection time and the adjustment may be combined in any suitable manner.

The prediction model also accounts for a travel time of a shopper fulfilling the order, accounting for a time interval after the shopper selects the order for fulfillment for the shopper to obtain the items of the order from a warehouse 110 identified by the order and to deliver the items from the order to a location identified by the order. The travel time is determined from characteristics of the order as well as historical information about traffic or road conditions the online concierge system 102 obtains from a third party system or from previously fulfilled orders by shoppers. Characteristics of the order used to determine travel time include a number of items in the order (orders with greater number of items may increase a length of time in a warehouse 110 to obtain the items), a warehouse 110 from which the items are obtained, and a distance between the location of the warehouse 110 from which the items are obtained and a location identified by the order.

In various embodiments, the online concierge system 102 trains and maintains separate models for determining a selection time of an order, an adjustment to the selection time of the order, and a travel time of the order. Each of the models be any machine learning model, such as a neural network, boosted tree, gradient boosted tree, random forest model, or combination of machine learning models. Different types of machine learning models may be used to determine the selection time of an order, the adjustment to the selection time of the order, and the travel time of the order, with the prediction model combining the separate models to determine a predicted delivery time for an order. For example, the predicted delivery time for the order is a sum of the travel time of the order and a product of the selection time of the order and the adjustment to the selection time of the order. However, in other embodiments, the predicted delivery time is determined from any suitable combination of the travel time of the order, the adjustment to the selection time of the order, and the selection time of the order. Alternatively, the prediction model is a single model generating the selection time of an order, an adjustment to the selection time of the order, a travel time of the order, and determining the delivery time of the order by combining the selection time, the adjustment to the selection time, and the travel time.

While the prediction model is trained 510 through any suitable training process, such as minimizing one or more loss functions based on predicted delivery times and measured delivery times (e.g., minimizing a mean squared error between a predicted delivery time for an order and a measured delivery time for the order for multiple orders in a training set), the prediction errors used to evaluate the prediction model are not directly linked to quantities likely to affect subsequent user interaction with the online concierge system 102. For example, loss functions describing accuracy the prediction model do not account for a length of time a user waits for an order to be fulfilled or whether the order was fulfilled after a time the online concierge system 102 identified to the user. Similarly, improving performance of the prediction model may increase an accuracy of the prediction model, but result in a number of orders being fulfilled after a time identified to the user by online concierge system 102, which may deter users from subsequently providing additional orders to the online concierge systems 102

To account for factors affecting likelihoods of users placing additional orders through the online concierge system 102, when training 510 the prediction model the online concierge system 102 also generates 515 a policy optimization model that accounts for wait times for users from receipt of an order from the user by the online concierge system 102 to fulfillment of the order and a percentage of orders fulfilled after a time for fulfillment identified to a user by the online concierge system 102. The policy optimization model receives a delivery time predicted by the prediction model and determines a modification to the predicted delivery time predicted by the prediction model, with the policy optimization model determining a modification to a predicted delivery time from the prediction model to optimize a probability of an order being fulfilled after a combination of the modification to the predicted delivery time and a wait time for users from receipt of an order from the user by the online concierge system 102 to fulfillment of the order. As shortening a wait time increases a probability of the order being fulfilled after a time identified by the online concierge system, while decreasing the probability of the order being fulfilled after the time identified by the online concierge system increases the wait time, to optimize these different objectives, the online concierge system 102 specifies a threshold probability of an order being fulfilled after a time identified by the online concierge system 102 and generates 515 the policy optimization model to optimize a wait time for an order as a function of the predicted delivery time and the modification subject to a constraint that the probability of the order being fulfilled after a time identified by the online concierge system 102 does not exceed the threshold probability. This allows the policy optimization model to balance between minimizing late deliveries and wait times. In various embodiments, the online concierge system 102 generates 515 the policy optimization model by solving a stochastic optimization problem with the constraint of the probability of the order being fulfilled after a predicted time identified by the online concierge system 102 not exceeding the threshold probability. An example process for generating 515 the policy optimization model is described in "Solving Chance-Constrained Stochastic Programs via Sampling and Integer Programming" by Shabbir Ahmed in Alexander Shapiro in INFORMS TutORials in Operations Research, published online by Institute for Operations Research and the Management Sciences on Oct. 14, 2014 at 261-269 (https://doi.org/10.1287/educ.1080.0048) which is hereby incorporated by reference herein in its entirety. In other embodiments, the online concierge system 102 generates 515 the policy optimization model to determine a modification to a predicted delivery time from the prediction model to optimize a probability of an order being fulfilled after a combination of the modification to the predicted delivery time and a user performing a specific interaction, such as providing an order to the online concierge system 102 (which is affected by a wait time from receipt of an order from the user by the online concierge system 102 to fulfillment of the order). In such an implementation, the online concierge system 102 generates 515 the policy optimization model to balance between minimizing late deliveries and a likelihood of the user performing the specific interaction, allowing the policy optimization model to optimize the user performing the specific interaction subject to the constraint that a probability of the order being fulfilled after a time identified by the online concierge system 102 does not exceed the threshold probability.

In other embodiments, the policy optimization model accounts for other factors to determine the modification to the delivery time predicted by the prediction model. For example, the online concierge system 102 specifies a threshold probability of an order being fulfilled greater than a specified duration after a time identified by the online concierge system 102, and the policy optimization model optimizes a wait time for an order as a function of the predicted delivery time and the modification subject to a constraint that the probability of the order being fulfilled greater than the specified duration after the time identified by the online concierge system 102 does not exceed the threshold probability. In other embodiments, rather than optimize a wait time as a function of the predicted delivery time and the modification subject to a constraint that the probability of the order being fulfilled after a time identified by the online concierge system 102 does not exceed the threshold probability (or a constraint that the probability of the order being fulfilled greater than the specified duration after the time identified by the online concierge system 102 does not exceed a threshold probability of the order being fulfilled greater than a specified duration after a time identified by the online concierge system), the policy optimization model optimizes an amount of shoppers available during one or more discrete time intervals relative to a time when a request for an order was received, optimizes a cost to the online concierge system 102 of fulfilling orders, optimizing a conversion rate for users performing a specific interaction with the online concierge system 102 (e.g., placing an order with the online concierge system 102); in various embodiments, the conversion rate is determined through another model trained from prior conversions by users of the online concierge system 102. However, in other embodiments, the online concierge system 102 optimizes any suitable metric affecting a placement of an order by a user subject to a constraint on any suitable quantity describing fulfillment of orders after the time identified by the online concierge system 102. Hence, in various embodiments, the online concierge system 102 uses any suitable quantities for the policy optimization to determine the modification to the delivery time.

Figure 6:
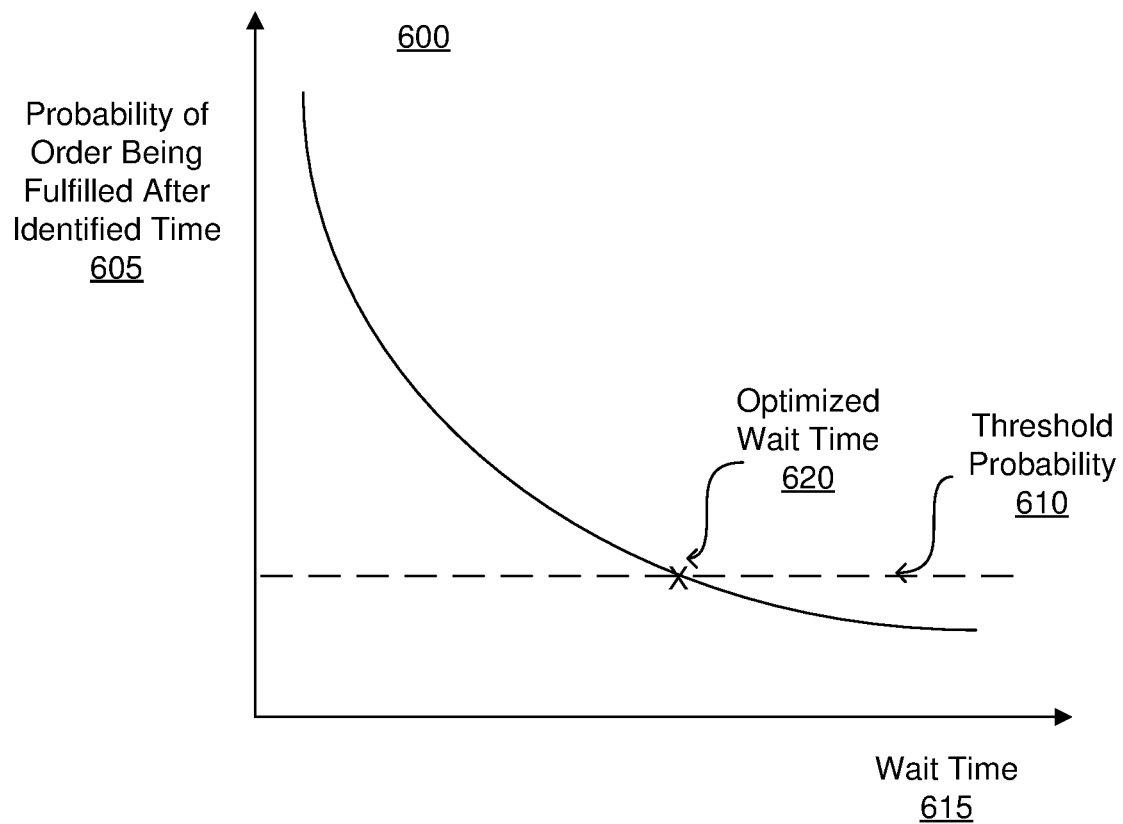
FIG. 6 is an example generation of a policy optimization model from probabilities of order being fulfilled after a time identified by the online concierge system against a wait time for order fulfillment, according to one embodiment.

FIG. 6 shows an example for generating 515 the policy optimization model via a graph 600 of probabilities 605 of an order being fulfilled after a time identified by the online concierge system 102 against a wait time 615 for order fulfillment. FIG. 6 shows a threshold probability 610 (e.g., 10%) of the order being fulfilled after the time identified by the online concierge system 102 that specifies a constraint for generating 515 the policy optimization model. The policy optimization model determines a modification to a predicted delivery time from the prediction model resulting in a combination of the predicted delivery time and the prediction model that is the optimized wait time 620 shown in FIG. 6.

Referring back to FIG. 5, the policy optimization model receives a predicted delivery time from the predicted model and determines a modification to the predicted delivery time as a function of the predicted delivery time, allowing the policy optimization model to determine different modifications to different predicted delivery times in various embodiments. The policy optimization model is generated during a training interval or a training stage, with the policy optimization model stored for subsequent application to subsequently received orders. The online concierge system 102 combines a predicted delivery time and the modification from the policy optimization model for a modified delivery time for an order. For example, the online concierge system 102 adds the modification to the predicted delivery time to determine the modified delivery time for the order.

After training the prediction model and generating the policy optimization model, the online concierge system 102 receives 520 a request for an order from a user. From application of the prediction model to the order, the online concierge system 102 determines 525 a predicted delivery time for the order. By applying the policy optimization model to the predicted delivery time, the online concierge system 102 determines 530 a modification to the predicted delivery time and generates 535 a modified delivery time for the order by combining the predicted delivery time and the modification (e.g., by summing the predicted delivery time and the modification). From a time when the additional order was received 520 and the modified delivery time, the online concierge system 102 determines 540 an estimated time of arrival (ETA) of the order to the user. For example, the online concierge system 102 adds the modified delivery time to the time when the request for the order was received 520 to determine 540 the estimated time of arrival of the order and displays the estimated time of arrival of the order to the user. For example, the estimated time of arrival of the order is displayed in an interface in conjunction with information identifying the order. The interface may also display an option to have the order fulfilled by the estimated time of arrival, allowing the user to select short term fulfillment of the order based on the estimated time of arrival determined 540 by the online concierge system 102, allowing the user to specify when the order is fulfilled from the interface displayed after the online concierge system 102 receives 520 the request for the order and before the user finalizes the order for fulfillment by the online concierge system 102. This allows the online concierge system 102 to provide modified estimated time of arrivals to a user that reduces wait time for order fulfillment while reducing a probability of the order being fulfilled after a time identified to the user by the online concierge system 102 when the online concierge system 102 receives 520 a request for an order.

Figure 7:
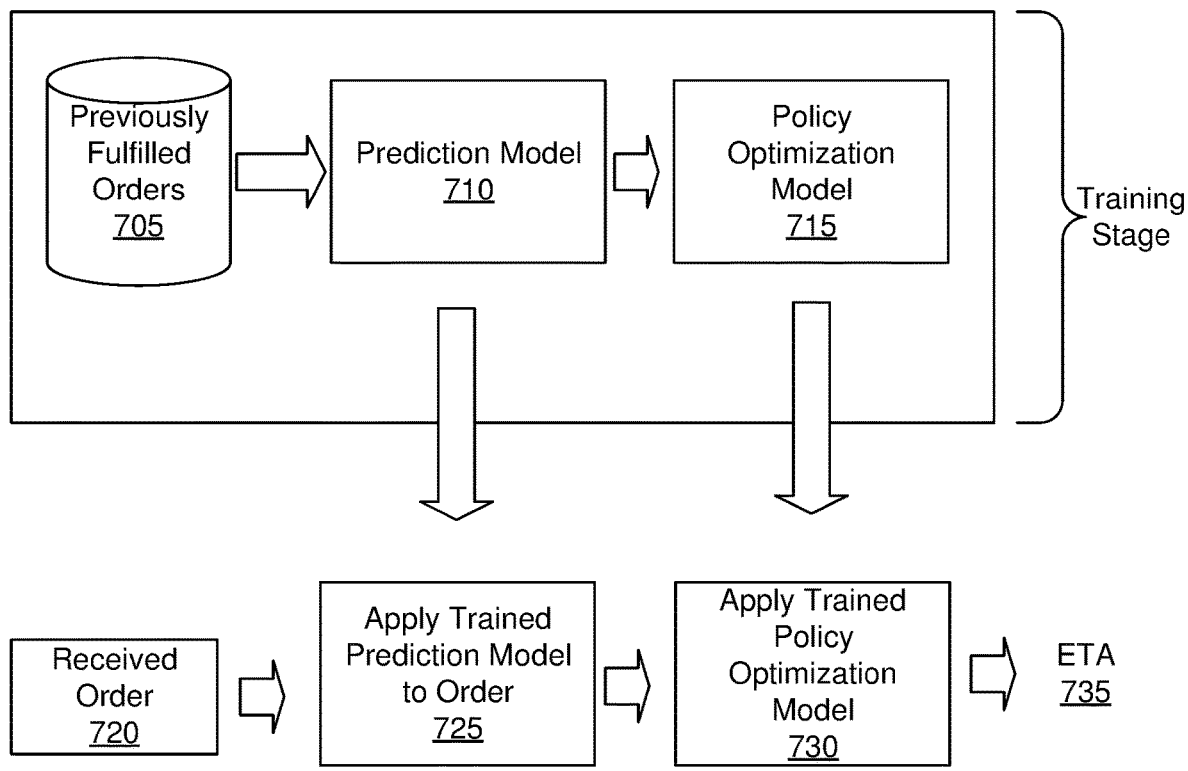
FIG. 7 is a process flow diagram of a method for determining an estimated time of arrival of an order received by an online concierge system to a user, according to one embodiment.

FIG. 7 is a process follow diagram of one embodiment of a method for determining an estimated time of arrival of an order received by an online concierge system 102 to a user. As further described above in conjunction with FIG. 6, during a training stage, the online concierge system 102 retrieves previously fulfilled orders 705 and trains a prediction model 710 to determine a predicted delivery time for an order based on characteristics of the order, such as a location identified by the order for fulfillment, a warehouse 110 from which the order is fulfilled, items included in the order, and a distance from the warehouse 110 to the location identified by the order. As further described above in conjunction with FIG. 5, the prediction model 710 accounts for a selection time representing a time interval from receipt of an order to a shopper selecting the order for fulfillment and a travel time indicating a length of time for a shopper to obtain items from the identified warehouse 110 and to deliver the items to the location identified by the order.

From predicted delivery times generated for orders from the prediction model 710, the online concierge system 102 generates a policy optimization model 715. The policy optimization model 715 receives a delivery time predicted by the prediction model and determines a modification to the predicted delivery time predicted by the prediction model 710. As further described above in conjunction with FIGS. 5 and 6, the policy optimization model 715 determines a modification to a delivery time predicted by the prediction model 710 to optimize a probability of an order being fulfilled after a combination of the modification to the predicted delivery time and a wait time for users from receipt of an order from the user by the online concierge system 102 to fulfillment of the order. For example, the policy optimization model 715 optimizes a wait time for an order as a function of the predicted delivery time and the modification subject to a constraint that the probability of the order being fulfilled after a time identified by the online concierge system 102 for fulfillment does not exceed the threshold probability. This allows the policy optimization model 715 to balance between minimizing late deliveries and wait times.

After generating the policy optimization model 715 and training the prediction model 710, the online concierge system 102 receives a request for an order 720 and applies 725 the trained prediction model 710 to the request for the order, generating a delivery time for the order. The online concierge system 102 applies 730 the policy optimization model 715 to the delivery time, generating a modification to the predicted delivery time that is a function of the predicted delivery time. By combining the modification and the delivery time, the online concierge system 102 generates a modified delivery time that is combined with a time when the request for the order 720 was received to generate an estimated time of arrival 735 for the order to the user, with the estimated time of arrival minimizing wait time for order fulfillment while reducing a probability of the order being fulfilled after a time identified to the user by the online concierge system 102 from the modification generated by the policy optimization model 725.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:

receiving an order at an online concierge system from a user, the order including one or more items and identifying a location to which the one or more items are delivered, the order to be displayed to one or more shopper mobile applications for one or more shoppers to select whether to fulfill the order;

determining, by a first machine learning model, a predicted delivery time for the order, the predicted delivery time determined from the location identified by the order and historical rates at which shoppers decide to select orders within a geographic region that includes the location, the predicted delivery time including a predicted length of time that a particular shopper decides to accept the order for fulfillment;

determining a modification to the predicted delivery time by applying a second machine learning model to the predicted delivery time, the second machine learning model determining the modification to optimize a predicted time identified to the user for fulfillment of the order subject to a constraint that a probability of the order being fulfilled after a time identified by the online concierge system does not exceed a threshold probability, wherein training of the second machine learning model comprises:

setting a threshold probability of the order being fulfilled after the predicted delivery time determined by the first machine learning model, subjecting the modification to a constraint that a probability of the order being fulfilled after the predicted delivery time determined by the first machine learning model does not exceed the threshold probability, and solving a stochastic optimization problem with the constraint that involves the predicted delivery time determined by the first machine learning model;

generating a modified delivery time by combining the predicted delivery time and the modification;

generating an estimated time of arrival of the order to the user by combining the modified delivery time and a time when the online concierge system received the order; and displaying the estimated time of arrival to the user in an interface in conjunction with information identifying the order.

2. The method of claim 1, wherein the interface further displays an option for the user to select fulfillment of the order by the estimated time of arrival.

3. The method of claim 1, wherein the predicted length of time that a particular shopper decides to accept the order for fulfillment is determined based on a rate at which the online concierge system receives orders including locations within the determined geographic region, a rate at which shoppers select orders including locations within the determined geographic region for fulfillment, and a number of orders including locations within the determined geographic region received by the online concierge system and not selected for fulfillment by shoppers.

4. The method of claim 3, wherein the predicted length of time comprises an average selection time for the determined geographic region.

5. The method of claim 1, wherein determining the predicted delivery time for the order further comprises:

identifying one or more characteristics of the order;

determining an adjustment for the predicted delivery time based on the one or more characteristics of the order; and generating a delivery specific selection time for the order by combining the predicted delivery time and the adjustment.

6. The method of claim 5, wherein the one or more characteristics of the order are selected from a group consisting of: a number of items in the order, a distance between a warehouse identified in the order and the location identified in the order, a value of the order, an amount of compensation the user provides a shopper for fulfilling the order, and any combination thereof.

7. The method of claim 5, wherein generating the delivery specific selection time for the order by combining the predicted delivery time and the adjustment comprises:

determining a product of the adjustment and the predicted delivery time.

8. The method of claim 5, wherein determining the predicted delivery time for the order further comprises:

determining a travel time for a shopper delivering items from a warehouse identified by the order to the location identified by the order based on characteristics of the order; and determining the predicted delivery time as a combination of the travel time and the delivery specific selection time.

9. The method of claim 8, wherein the characteristics of the order are selected from a group consisting of: a number of items in the order, a warehouse identified by the order, and a distance between the warehouse identified by the order and the location identified by the order.

10. The method of claim 1, wherein the second machine learning model determines the modification as a function of the predicted delivery time so different predicted delivery times have different modifications.

11. A computer program product comprising a non-transitory computer readable storage medium having instructions encoded thereon that, when executed by a processor, cause the processor to:

receive an order at an online concierge system from a user, the order including one or more items and identifying a location to which the one or more items are delivered, the order to be displayed to one or more shopper mobile applications for one or more shoppers to select whether to fulfill the order;

determine, by a first machine learning model, a predicted delivery time for the order, the predicted delivery time determined from the location identified by the order and historical rates at which shoppers decide to select orders within a geographic region that includes the location, the predicted delivery time including a predicted length of time that a particular shopper decides to accept the order for fulfillment;

determine a modification to the predicted delivery time by applying a second machine learning model to the predicted delivery time, the second machine learning model determining the modification to optimize a predicted time identified to the user for fulfillment of the order subject to a constraint that a probability of the order being fulfilled after a time identified by the online concierge system does not exceed a threshold probability, wherein training of the second machine learning model comprises:

setting a threshold probability of the order being fulfilled after the predicted delivery time determined by the first machine learning model, subjecting the modification to a constraint that a probability of the order being fulfilled after the predicted delivery time determined by the first machine learning model does not exceed the threshold probability, and solving a stochastic optimization problem with the constraint that involves the predicted delivery time determined by the first machine learning model;

generate a modified delivery time by combining the predicted delivery time and the modification;

generate an estimated time of arrival of the order to the user by combining the modified delivery time and a time when the online concierge system received the order; and display the estimated time of arrival to the user in an interface in conjunction with information identifying the order.

12. The computer program product of claim 11, wherein the interface further displays an option for the user to select fulfillment of the order by the estimated time of arrival.

13. The computer program product of claim 11, wherein the predicted length of time that a particular shopper decides to accept the order for fulfillment is determined based on a rate at which the online concierge system receives orders including locations within the determined geographic region, a rate at which shoppers select orders including locations within the determined geographic region for fulfillment, and a number of orders including locations within the determined geographic region received by the online concierge system and not selected for fulfillment by shoppers.

14. The computer program product of claim 13, wherein the predicted length of time comprises an average selection time for the determined geographic region.

15. The computer program product of claim 11, wherein determine the predicted delivery time for the order further comprises:

identify one or more characteristics of the order;

determine an adjustment for the predicted delivery time based on the one or more characteristics of the order; and generate a delivery specific selection time for the order by combining the predicted delivery time and the adjustment.

16. The computer program product of claim 15, wherein the one or more characteristics of the order are selected from a group consisting of: a number of items in the order, a distance between a warehouse identified in the order and the location identified in the order, a value of the order, an amount of compensation the user provides a shopper for fulfilling the order, and any combination thereof.

17. The computer program product of claim 15, wherein generate the delivery specific selection time for the order by combining the predicted delivery time and the adjustment comprises:

determine a product of the adjustment and the predicted delivery time.

18. The computer program product of claim 15, wherein determine the predicted delivery time for the order further comprises:

determine a travel time for a shopper delivering items from a warehouse identified by the order to the location identified by the order based on characteristics of the order; and determine the predicted delivery time as a combination of the travel time and the delivery specific selection time.

19. A system comprising:

a processor; and memory configured to store code comprising instructions, the instructions, when executed by the processor, cause the processor to:

receive an order at an online concierge system from a user, the order including one or more items and identifying a location to which the one or more items are delivered, the order to be displayed to one or more shopper mobile applications for one or more shoppers to select whether to fulfill the order;

determine, by a first machine learning model, a predicted delivery time for the order, the predicted delivery time determined from the location identified by the order and historical rates at which shoppers decide to select orders within a geographic region that includes the location, the predicted delivery time including a predicted length of time that a particular shopper decides to accept the order for fulfillment;

determine a modification to the predicted delivery time by applying a second machine learning model to the predicted delivery time, the second machine learning model determining the modification to optimize a predicted time identified to the user for fulfillment of the order subject to a constraint that a probability of the order being fulfilled after a time identified by the online concierge system does not exceed a threshold probability, wherein training of the second machine learning model comprises:

setting a threshold probability of the order being fulfilled after the predicted delivery time determined by the first machine learning model, subjecting the modification to a constraint that a probability of the order being fulfilled after the predicted delivery time determined by the first machine learning model does not exceed the threshold probability, and solving a stochastic optimization problem with the constraint that involves the predicted delivery time determined by the first machine learning model;

generate a modified delivery time by combining the predicted delivery time and the modification;

generate an estimated time of arrival of the order to the user by combining the modified delivery time and a time when the online concierge system received the order; and display the estimated time of arrival to the user in an interface in conjunction with information identifying the order.

20. The system of claim 19, wherein the interface further displays an option for the user to select fulfillment of the order by the estimated time of arrival.

* * * * *